(12) United States Patent
Wu et al.

(10) Patent No.: US 11,260,469 B2
(45) Date of Patent: Mar. 1, 2022

(54) FRICTION STIR WELDING APPARATUS AND FRICTION STIR WELDING SYSTEM COMPRISING THE SAME

(71) Applicant: TSINGHUA UNIVERSITY, Beijing (CN)

(72) Inventors: Jun Wu, Beijing (CN); Guang Yu, Beijing (CN); Binbin Zhang, Beijing (CN); Hengchun Cui, Beijing (CN); Liping Wang, Beijing (CN); Ying Gao, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 42 days.

(21) Appl. No.: 16/964,160

(22) PCT Filed: Jul. 4, 2018

(86) PCT No.: PCT/CN2018/094418
§ 371 (c)(1),
(2) Date: Jul. 22, 2020

(87) PCT Pub. No.: WO2019/140869
PCT Pub. Date: Jul. 25, 2019

(65) Prior Publication Data
US 2021/0031296 A1 Feb. 4, 2021

(30) Foreign Application Priority Data

Jan. 22, 2018 (CN) .......................... 201810059766.5

(51) Int. Cl.
*B23K 20/12* (2006.01)
*B23K 37/02* (2006.01)
*B23K 101/06* (2006.01)

(52) U.S. Cl.
CPC .......... *B23K 20/126* (2013.01); *B23K 20/125* (2013.01); *B23K 37/0229* (2013.01); *B23K 2101/06* (2018.08)

(58) Field of Classification Search
CPC .......................... B23K 20/126; B23K 20/125; B23K 37/0229; B23K 2101/06; B23K 2101/04;
(Continued)

(56) References Cited

U.S. PATENT DOCUMENTS

2004/0129763 A1 7/2004 Burford et al.
2005/0178816 A1* 8/2005 Stevenson ................ B23H 9/00
228/112.1

(Continued)

FOREIGN PATENT DOCUMENTS

CN 103480963 A 1/2014
CN 103551728 A 2/2014
(Continued)

OTHER PUBLICATIONS

International Search Report and Written Opinion issued by the Chinese Patent Office for PCT Application PCT/CN2018/094418, dated Aug. 31, 2018.

*Primary Examiner* — Kiley S Stoner
(74) *Attorney, Agent, or Firm* — Holzer Patel Drennan

(57) ABSTRACT

The presently disclosed technology includes a friction stir welding apparatus comprising a frame, a moving platform and a parallel mechanism composed of three branch mechanisms, wherein a first branch mechanism comprises a first sliding pair, a first revolute pair, a telescopic rod and a first spherical pair connected in sequence. A second branch mechanism and a third branch mechanism both comprise a third sliding pair, a second revolute pair, a third linkage and a second spherical pair connected in sequence. The friction stir welding apparatus has high stiffness, low inertia, high dynamic performance and high accuracy, which can achieve (Continued)

precision welding with high requirements on processing quality and accuracy for jointing annular seams of large-scale rocket fuel storage tank barrels in the aviation field, for example. The presently disclosed technology also includes a corresponding friction stir welding system.

10 Claims, 2 Drawing Sheets

(58) Field of Classification Search
  CPC ............... B23K 20/1245; B23K 20/26; B23K 37/0538; B23K 20/122–1295
  USPC ............... 228/112.1–114.5, 2.1–2.3
  See application file for complete search history.

(56) References Cited

U.S. PATENT DOCUMENTS

| | | | |
|---|---|---|---|
| 2006/0059671 A1* | 3/2006 | Okafuji | B23K 20/122 29/56.5 |
| 2010/0213242 A1* | 8/2010 | Fujimoto | B23K 37/0294 228/2.1 |
| 2011/0041982 A1* | 2/2011 | Fleming | B23K 20/123 156/64 |
| 2011/0079339 A1* | 4/2011 | Cruz | B23K 20/123 156/64 |
| 2012/0018492 A1 | 1/2012 | Nakagawa et al. | |
| 2012/0298725 A1* | 11/2012 | Biggs | B23K 37/0538 228/2.1 |
| 2014/0183246 A1* | 7/2014 | Saitou | B23K 20/126 228/2.1 |
| 2015/0028082 A1* | 1/2015 | Miller | B23K 20/1295 228/112.1 |
| 2015/0028083 A1* | 1/2015 | Miller | B23K 20/14 228/112.1 |
| 2020/0016759 A1* | 1/2020 | Kim | B25J 9/1682 |
| 2020/0206937 A1* | 7/2020 | Otsuki | G05B 19/4182 |

FOREIGN PATENT DOCUMENTS

| | | |
|---|---|---|
| CN | 103878477 A | 6/2014 |
| CN | 103909518 A | 7/2014 |
| CN | 104625198 A | 5/2015 |
| CN | 105436700 A | 3/2016 |
| CN | 105856204 A | 8/2016 |
| CN | 106584429 A | 4/2017 |
| CN | 206344134 U | 7/2017 |

* cited by examiner

FRICTION STIR WELDING APPARATUS AND FRICTION STIR WELDING SYSTEM COMPRISING THE SAME

TECHNICAL FIELD

The present invention relates to the field of mechanical manufacturing, in particular, the present invention relates to a friction stir welding apparatus and a friction stir welding system including the friction stir welding apparatus.

BACKGROUND ART

Friction stir welding uses a special form of stirring head to proceed forward while rotating, and generates heat by friction between the stirring head and the workpiece to be welded, and the workpiece to be welded is in a thermoplastic state at local position due to the generated friction heat, and the generated friction heat plastically flows from the front end to the rear end under the pressure of the stirring head, thereby the workpiece to be welded is pressure-welded into an integral member. Since the above method is solid-phase welding, the heating process has the characteristics of high energy density and rapid heat input speed. Therefore, the welding deformation is small and the residual stress after welding is small. Meanwhile, the friction stir welding process does not generate arc radiation, smoke and dust, as well as spatter, and has low noise, therefore the friction stir welding process is an environment friendly production and processing. Therefore, friction stir welding has been widely used.

At present, as for welding parts with complicated welding surfaces, the existing friction stir welding apparatus generally adopts a series-connected structure so that the apparatus has five-axis linkage processing capability, however it will generate a large forging force during the processing, and the forging force results in the deformation of the series-connected structure, which affects the welding quality and the welding precision. In order to obtain welded parts having higher precision, the welding apparatus needs to have a sufficiently large rigidity.

SUMMARY

In view of the above problems, an object of the present invention is to provide a friction stir welding apparatus and a friction stir welding system including the friction stir welding apparatus, to solve the problems of low rigidity and thereby poor welding quality and poor welding precision in the existing friction stir welding apparatus.

In order to achieve the above object, one aspect of the present invention is to provide a friction stir welding apparatus comprising:

a frame including a frame platform and a frame body for supporting the frame platform, each of an upper surface and a lower surface of the frame platform is provided with a pair of sliding rails disposed opposite to each other;

a moving platform which is mounted with a stirring head on one surface thereof;

a first branch mechanism comprising a first sliding pair, a first revolute pair, a telescopic rod and a first spherical pair connected in sequence, wherein the first sliding pair is movable along the pair of sliding rails on the upper surface of the frame platform, and a rotation axis of the first revolute pair is parallel to a plane composed of the sliding rails on the upper surface of the frame platform, and the first spherical pair is connected with a surface of the moving platform on which the stirring head is not mounted; and a second branch mechanism and a third branch mechanism, each of the second branch mechanism and the third branch mechanism comprises a third sliding pair, a second revolute pair, a third linkage and a second spherical pair connected in sequence, wherein the third sliding pair is movable along the pair of sliding rails on the lower surface of the frame platform, and a rotation axis of the second revolute pair is perpendicular to a plane composed of the sliding rails on the lower surface of the frame platform, and the second spherical pair is connected with the surface of the moving platform on which the stirring head is not mounted.

Preferably, each of the first branch mechanism, the second branch mechanism, and the third branch mechanism is hinged with the moving platform, and hinged center points are uniformly distributed with respect to a center of the moving platform.

Preferably, a plane composed of the third linkage of the second branch mechanism and the third linkage of the third branch mechanism is parallel to the plane composed of the sliding rails on the lower surface of the frame platform.

Preferably, the telescopic rod comprises a first linkage, a second sliding pair and a second linkage connected in sequence, and the second linkage moves along the first linkage through the second sliding pair.

Preferably, the second sliding pair is a driving mechanism for driving a guide screw by a servo motor.

Preferably, the first sliding pair and the third sliding pair are driving mechanisms for driving a pinion and rack are driven by dual servo motors.

Preferably, the first spherical pair and the second spherical pair are spherical hinges or are composite spherical hinges in which rotation axes in three vertical directions intersect into a point.

In order to achieve the above object, another aspect of the present invention is to provide a friction stir welding system comprising the friction stir welding apparatus as described above and a fastening device, and the fastening device is used for fixing a workpiece to be welded, and the workpiece to be welded is welded by the stirring head.

Preferably, the system further comprises a worktable on which a sliding groove is provided, and the fastening device is mounted in the sliding grooves and is movable along the sliding grooves.

Preferably, the fastening device comprises a pair of fasteners disposed opposite to each other, and the workpiece to be welded is located between the two fasteners, and rotation axes of the two fasteners are on the same straight line.

Compared with the prior art, the present invention has the following advantages and beneficial effects.

The present invention adopts a parallel mechanism composed of the first branch mechanism, the second branch mechanism and the third branch mechanism, so that the friction stir welding apparatus of the present invention has four degrees of freedom, and can realize the movement form in two-dimensional rotation and two-dimensional movement of the moving platform, so that it is easier to control the position and posture of the moving platform.

The present invention has the characteristics of high rigidity, low inertia, high dynamic performance and high precision, and the parallel mechanism has a simple and compact structure, a strong load capacity, a small mass of the moving components, and is easy to achieve high speed movement, thereby the present invention can achieve a precision welding with high requirements on the processing quality and accuracy for jointing the annular seams of the large-scale rocket fuel storage tank barrels in the aviation field.

The present invention uses a pair of fasteners having adjustable spans to fix the workpiece to be welded, thereby increasing the diameter and overall length of jointing annular seams of the barrels.

DETAILED DESCRIPTION OF EMBODIMENTS

Figure 1:
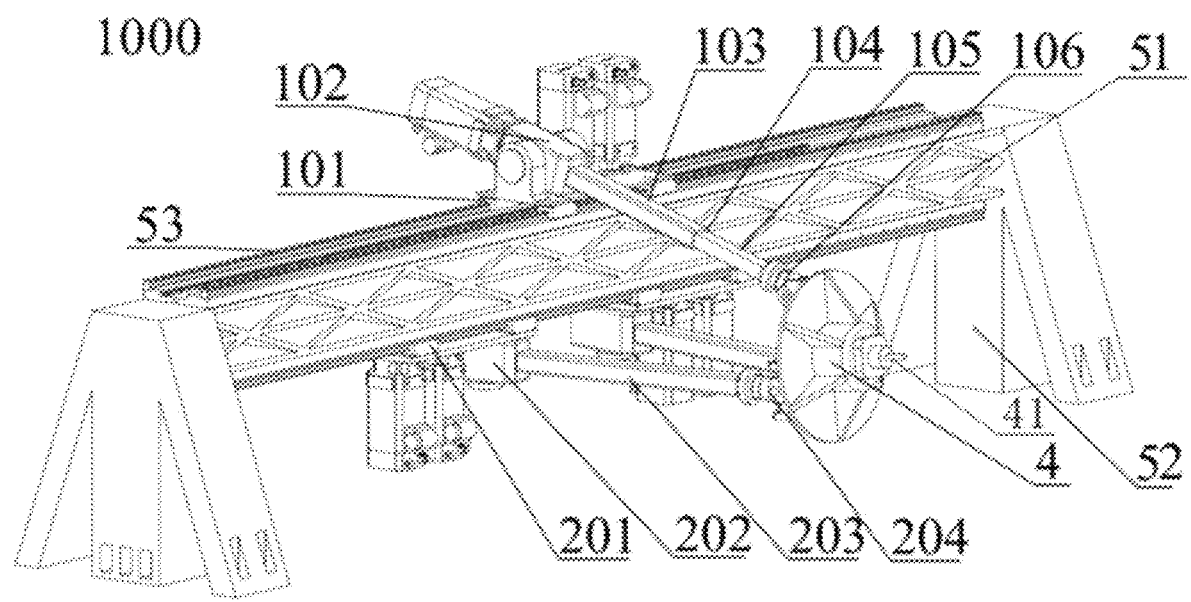
FIG. 1 is a schematic structural diagram of the friction stir welding apparatus of the present invention.

The embodiments of the present invention will be described below with reference to the attached drawings. Those of ordinary skill in the art may recognize that the described embodiments can be modified in various ways or in combinations thereof without departing from the spirit and scope of the present invention. Therefore, the attached drawings and descriptions are illustrative in nature and are not intended to limit the protection scope of the claims. In addition, in this Specification, the drawings are not drawn to scale, and the same reference numerals denote the same parts. Therefore, the drawings and descriptions are illustrative in nature and are not intended to limit the scope of protection of the claims. In addition, in the present Specification, the attached figures are not drawn to scale, and the same reference numerals indicate the same parts.

The present embodiment will be described in detail in combination with FIGS. 1 and 2 in the following.

Figure 2:
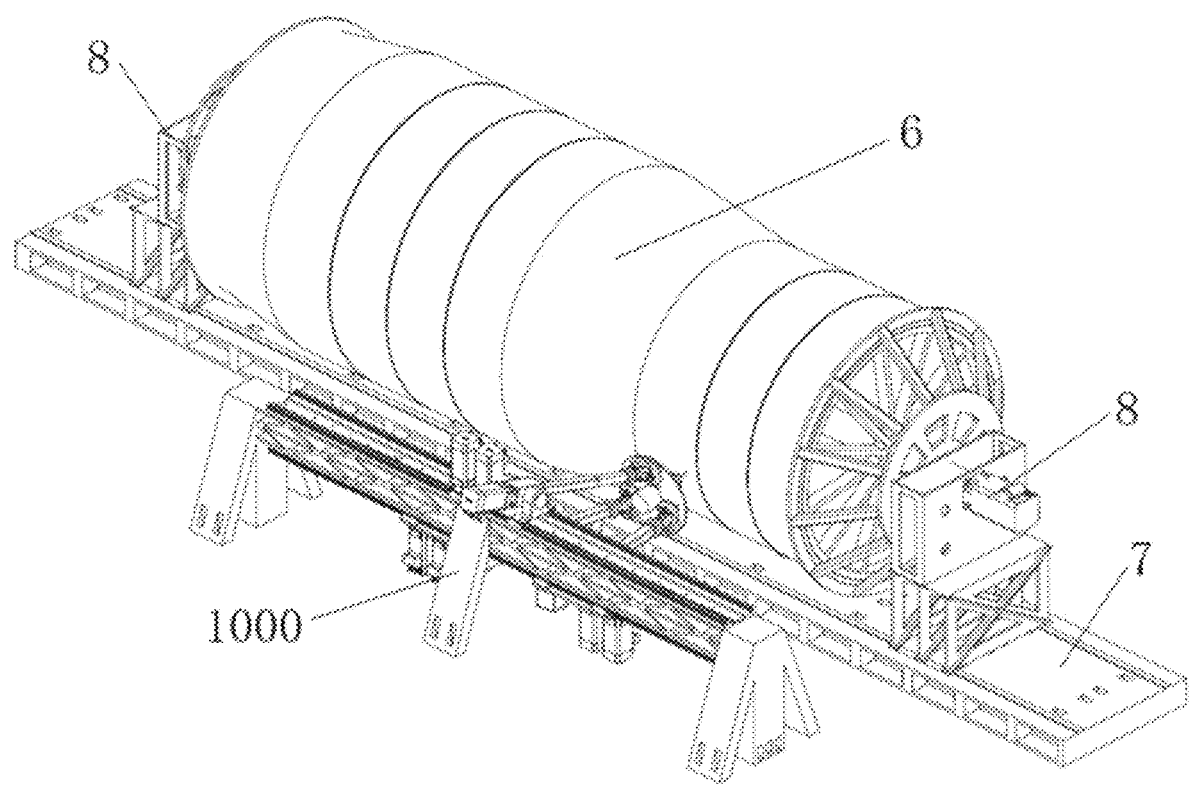
FIG. 2 is a schematic diagram of the friction stir welding system of the present invention.

FIG. 1 is a schematic structural diagram of the friction stir welding apparatus of the present invention, and as shown in FIG. 1, the friction stir welding apparatus of the present invention comprises a parallel mechanism composed of the first branch mechanism, the second branch mechanism and the third branch mechanism, a moving platform 4 and a frame, and the parallel mechanism is connected between the moving platform 4 and the frame.

The frame comprises a frame platform 51 and a frame body 52 for supporting the frame platform 51, and the frame platform 51 is disposed across the frame body 52, and an upper surface and a lower surface of the frame platform 51 is provided with a pair of sliding rails 53 disposed opposite to each other, respectively. The upper surface and the lower surface of the frame platform 51 are parallel, and the planes on which the two pairs of sliding rails are respectively disposed are parallel.

A stirring head 41 is mounted on one surface of the moving platform 4. Heat is generated by friction between the stirring head and the workpiece to be welded, so that the welding workpiece is in a thermoplastic state at local position, and the generated friction heat plastically flows from the front end to the rear end under the pressure of the stirring head, thereby the workpiece to be welded is pressure-welded into an integral member.

The parallel mechanism in the present invention comprises the first branch mechanism, the second branch mechanism and the third branch mechanism, and the branch mechanism, the second branch mechanism and the third branch mechanism are all connected between the frame and the moving platform.

The first branch mechanism comprises a first sliding pair 101, a first revolute pair 102, a telescopic rod and a first spherical pair 106 connected in sequence. Among them, the first sliding pair 101 is movable along a pair of sliding rails 53 on the upper surface of the frame platform 51, and the rotation axis of the first revolute pair 102 is parallel to the surface composed of the sliding rails 53 on the upper surface of the frame platform, and one end of the telescopic rod is connected to the first revolute pair 102, and the other end of the telescopic rod is connected to the first spherical pair 106, and the first spherical pair 106 is connected with a surface of the moving platform 4 on which the stirring head 41 is not provided. The first sliding pair 101 moves along the slide rails 53, which correspondingly driving the movement of the first revolute pair 102, the telescopic rod, the first spherical pair 106 and the moving platform 4 connected thereto. The telescopic rod can rotate around the first revolute pair 102, which correspondingly driving the first spherical pair 106 and the moving platform 4 to rotate.

The second branch mechanism and the third branch mechanism have the same mechanism composition, and each of the second branch mechanism and the third branch mechanism comprises a third sliding pair 201, a second revolute pair 202, a third linkage 203, and a second spherical pair 204 connected in sequence. The third sliding pair 201 is movable along a pair of sliding rails 53 on the lower surface of the frame platform 51, and the rotation axis of the second revolute pair 202 is perpendicular to the surface composed of the sliding rails on the lower surface of the frame platform, and one end of the third linkage 203 is connected to the second revolute pair 202, and the other end of the third linkage 203 is connected to the second spherical pair 204, and the second spherical pair 204 is connected with a surface of the moving platform 4 on which the stirring head 41 is not provided. The movement of the third sliding pair 201 along the slide rails drives the movement of the second revolute pair 202, the third linkage 203, the second spherical pair 204 and the moving platform 4 connected thereto, and the third linkage 203 can rotate around the second revolute pair 202, which correspondingly driving the rotation of the second spherical pair 204 and the moving platform 4.

In the present invention, the parallel mechanism has the characteristics of a simple and compact structure, high stiffness, strong load capacity, small mass of moving components and easy realization of high speed movement, etc., so that the friction stir welding apparatus of the present invention has advantages of high stiffness, high dynamic performance and high precision. Moreover, the friction stir welding apparatus of the present invention has four degrees of freedom, thereby can realize the two-dimensional rotation and two-dimensional movement of the moving platform, and it is easy to control the position and posture of the moving platform, so as to meet the requirements for welding the workpiece to be welded, and ensure higher welding accuracy.

As shown in FIG. 1, the telescopic rod in the first branch mechanism comprises the first linkage 103, a second sliding pair 104 and a second linkage 105 connected in sequence. The second linkage 105 moves along the first linkage 103 through the second sliding pair 104, thereby achieving telescopic movement of the first branch mechanism. The diameter of the second linkage 105 is slightly smaller than that of the first linkage 103, so as to facilitate the second linkage 105 to be inserted the into the first linkage 103, or the diameter of the second linkage 105 is slightly larger than that of the first linkage 103, so as to facilitate the second linkage 105 to be sleeved on the outer periphery of the first linkage 103.

The first sliding pair 101, the second sliding pair 104 in the first branch mechanism, and the third sliding pairs 201 in the second branch mechanism and the third branch mechanism are all driving pairs. In a preferred embodiment, both the first sliding pair 101 and the third sliding pair 201 adopt driving mechanisms in which the pinion and rack are driven by dual servo motor, to realize the movement of the three branch mechanisms respectively, so as to realize the movement of the moving platform along the direction of the sliding rails. The second sliding pair 104 adopts a driving mechanism in which the guide screw is driven by servo motor, to realize the telescopic movement of the first branch mechanism, so as to realize the movement of the moving platform along the direction of the first linkage and the second linkage. The first spherical pair 106 in the first branch mechanism, the second spherical pairs 204 in the second branch mechanism and the third branch mechanism are spherical hinges or composite spherical hinges in which rotation axes in three vertical direction intersect into a point, so that the three branch mechanisms are articulated with the moving platform and can rotate around the moving platform.

In the present invention, the first branch mechanism, the second branch mechanism, and the third branch mechanism are articulated with the moving platform 4 by the first spherical pair 106 and the second spherical pair 204, respectively. Preferably, each of the center points of articulated positions are uniformly distributed around the center of the moving platform 4, and they form an equilateral triangle. The articulated point between the first branch mechanism and the moving platform is located at the vertex on the top of the equilateral triangle, while the articulated point between the second branch mechanism and the moving platform and the articulated point between the third branch mechanism and the moving platform are located at the vertex on the bottom of the equilateral triangle. The second branch mechanism and the third branch mechanism are symmetrically arranged relative to the moving platform.

Preferably, the two third linkages 203 of the second branch mechanism and the third branch mechanism are located in the same plane, and the plane composed of the two third linkages 203 of the second branch mechanism and the third branch mechanism is parallel to the surface composed of the sliding rails 53 on the lower surface of the frame platform 51.

Another invention of the present invention provides a friction stir welding system. FIG. 2 is a schematic diagram of the friction stir welding system of the present invention. As shown in FIG. 2, the system comprises the friction stir welding apparatus 1000 as described above and a fastening device. The fastening device is used for fixing the workpiece to be welded 6, the workpiece to be welded 6 is welded by the stirring head 41, and heat generated by the friction between the stirring head 41 and the workpiece to be welded 6 is utilized to maintain the workpiece to be welded 6 in a thermoplastic state at local position. The stirring head 41 rotates and moves under the action of the parallel mechanism, and the welding of the workpiece to be welded 6 is completed under the pressure of the stirring head. The three branch mechanisms of the parallel mechanism are configured such that the stirring head 41 on the moving platform 4 has four degrees of freedom, thereby can realize rotations in two directions and movements in two directions to improve the welding precision.

In a preferred embodiment, the friction stir welding system further comprises a working platform 7 provided with sliding grooves thereon. The fastening device is mounted in the sliding grooves and is movable along the sliding grooves to adjust the position of the fastening device.

In the present invention, the fastening device is used for fixing the workpiece to be welded. The fastening device may be an integrated clamping device, and the fastening device also may be two separate components, and the workpiece to be welded is fixed between the two components. Preferably, the fastening device comprises a pair of fasteners 8 disposed opposite to each other, and the workpiece to be welded 6 is positioned between the two fasteners 8, and the rotation axes of the two fasteners 8 are on the same straight line. The electric driving device drives the rotation of the fasteners, so that the workpiece to be welded 6 can rotate around the rotation axis, which increases the degrees of freedom of the friction stir welding system and realizes the welding of the curved surface components. The fastener 8 is mounted in the sliding grooves of the working platform and can move along the sliding grooves, which is convenient for adjusting the distance between the two fasteners 8 according to the length of the workpiece to be welded 6.

Taking the application of the present invention in the processing for jointing the annular seams of large-scale rocket fuel tank barrels as an example, to describe the operation process of the friction stir welding system in the present invention.

The two fasteners 8 for the two-stages rocket fuel tank is clamped and fixed. By means of the movement of the first sliding pair 101 and the third sliding pair 201 on the sliding rails, the movement of the second sliding pair 104 in the direction of the first linkage 103 and the second linkage 105, and the rotations of the first revolute pair 102 and the second revolute pair 202, the moving platform 4 realizes rotations in two directions and movements in two directions so as to adjust the position and posture of the moving platform. In the process of welding by using the stirring head, the rocket fuel tank realizes the rotary motion thereof under the driving of the electric driving device of the fastener, so that the friction stir welding system of the present invention has five degrees of freedom. After the welding of the two-stage rocket fuel tank is completed, adjusting the positions of the two fasteners in order to increase the diameter or overall length of the annular seams of the barrels. One or more rocket storage tanks can be further added, and welding continues until the welding of all rocket fuel tanks are completed.

The invention is not only applicable to the process of the processing for jointing the annular seams of large-scale rocket fuel tank barrels, but also applicable to welding general components or complex components.

The above are only preferred embodiments of the present invention and are not intended to limit the present invention. For those skilled in the art, the present invention may have various modifications and changes. Any modification, equivalent replacement, improvement, etc. made within the spirit and principle of the present invention shall be included in the protection scope of the present invention.

What is claimed is:

1. A friction stir welding apparatus, comprising:
   a frame including a frame platform and a frame body for supporting the frame platform, each of an upper surface and a lower surface of the frame platform is provided with a pair of sliding rails disposed opposite to each other;
   a moving platform which is mounted with a stirring head on one surface thereof;
   a first branch mechanism comprising a first sliding pair, a first revolute pair, a telescopic rod and a first spherical pair connected in sequence, wherein the first sliding pair is movable along the pair of sliding rails on the upper surface of the frame platform, a rotation axis of the first revolute pair is parallel to a plane composed of the sliding rails on the upper surface of the frame platform, and the first spherical pair is connected with a surface of the moving platform on which the stirring head is not mounted; and a second branch mechanism and a third branch mechanism, each of the second branch mechanism and the third branch mechanism comprises a third sliding pair, a second revolute pair, a third linkage, and a second spherical pair connected in sequence, wherein the third sliding pair is movable along the pair of sliding rails on the lower surface of the frame platform, a rotation axis of the second revolute pair is perpendicular to a plane composed of the sliding rails on the lower surface of the frame platform, and the second spherical pair is connected with the surface of the moving platform on which the stirring head is not mounted.

2. The friction stir welding apparatus according to claim 1, wherein each of the first branch mechanism, the second branch mechanism, and the third branch mechanism is hinged with the moving platform, and hinged center points are uniformly distributed with respect to a center of the moving platform.

3. The friction stir welding apparatus according to claim 1, wherein a plane composed of the third linkage of the second branch mechanism and the third linkage of the third branch mechanism is parallel to the plane composed of the sliding rails on the lower surface of the frame platform.

4. The friction stir welding apparatus according to claim 1, wherein the telescopic rod comprises a first linkage, a second sliding pair and a second linkage connected in sequence, and the second linkage moves along the first linkage through the second sliding pair.

5. The friction stir welding apparatus according to claim 4, wherein the second sliding pair is a driving mechanism for driving a guide screw by a servo motor.

6. The friction stir welding apparatus according to claim 1, wherein the first sliding pair and the third sliding pair are driving mechanisms for driving a pinion and rack by dual servo motors.

7. The friction stir welding apparatus according to claim 1, wherein the first spherical pair and the second spherical pair are one of spherical hinges and composite spherical hinges in which rotation axes in three vertical directions intersect into a point.

8. A friction stir welding system, comprising:
the friction stir welding apparatus according to claim 1; and
a fastening device, the fastening device for fixing a workpiece to be welded, and the workpiece is to be welded by the stirring head.

9. The friction stir welding system according to claim 8, further comprising:
a worktable on which a sliding groove is provided, and the fastening device is mounted in the sliding groove and is movable along the sliding groove.

10. The friction stir welding system according to claim 9, wherein the fastening device comprises a pair of fasteners disposed opposite to each other, the workpiece to be welded is located between the pair of fasteners, and rotation axes of the pair of fasteners share a common straight line.

* * * * *